United States Patent [19]

Edwards et al.

[11] 4,140,023
[45] Feb. 20, 1979

[54] DIFFERENTIAL PRESSURE TRANSDUCER

[75] Inventors: Ronald Edwards, San Clemente; Terence K. Rhind, Riverside, both of Calif.

[73] Assignee: Bourns, Inc., Riverside, Calif.

[21] Appl. No.: 876,294

[22] Filed: Feb. 9, 1978

[51] Int. Cl.² ............................................. G01L 9/06
[52] U.S. Cl. ...................................... 73/721; 73/765
[58] Field of Search ............... 73/721, 727, 88.5 SD, 73/720, 726; 338/4, 42

[56] References Cited

U.S. PATENT DOCUMENTS 2,315,756  4/1943  Warner ................................. 73/721
3,624,714  11/1971 Frassrand ............................. 73/727
3,753,196  8/1973  Kurtz et al. ....................... 73/88.5 SD Primary Examiner—Donald O. Woodiel
Attorney, Agent, or Firm—Paul H. Ware; William G. Becker

[57] ABSTRACT

A piezoresistive differential pressure transducer in which the need for convoluted isolating diaphragms and oil fill is eliminated. The instrument as contemplated by the invention does not require O-ring seals or springs to provide over-pressure protection. The absence of convoluted diaphragms and oil minimizes inherent errors due to temperature variations and static line pressure effect.

6 Claims, 3 Drawing Figures

DIFFERENTIAL PRESSURE TRANSDUCER

BACKGROUND OF THE INVENTION

1. Field of the Invention

This invention relates generally to pressure transducers and measuring devices and more particularly to differential pressure transducers and measuring devices employing piezoresistive strain sensitive elements as sensors. Piezoresistive elements are elements whose resistance changes proportionately to an induced strain.

2. Description of the Prior Art

The prior art has shown the use of piezoresistive strain sensitive elements in the measurement of force. In many examples of the prior art, these piezoresistive elements are bonded or otherwise attached to a flexible diaphragm and connected together to form a Wheatstone bridge. Fluid pressures in particular have been commonly measured using edge supported flexible diaphragms that are arranged to deflect concavely or convexly in response to pressure differentials on opposite faces of the diaphragm. As the diaphragm deflects in response to an applied pressure, tension and compression forces are created that may be used to measure the applied pressure as a function of the deflection of the diaphragm. That is to say, the resulting strain created in the diaphragm is a function of the stress causing that strain. In turn, the deflection of the diaphragm may be determined as a function of the change in resistance of suitably mounted piezoresistive strain sensitive elements. The prior art is replete with arrangements of these strain sensitive elements so as to give optimum signal output as a function of position on a diaphragm. Another prior art development has been concerned with the employment of diffusion techniques in the semiconductor art to form Wheatstone bridge connections between compressive and tension gages formed on a single semiconductor chip. Some of these prior art devices have been brought to the attention of the applicant's attorney through a search conducted at the United States Patent and Trademark Office and are listed as follows:

| PATENT NO. | INVENTOR |
|---|---|
| 3,247,719 | Chelner |
| 3,624,714 | Frasrand |
| 3,744,317 | Hessinger |
| 3,149,488 | Castro |
| 3,230,763 | Frantyis |
| 3,239,696 | Burkhalter |
| 3,372,577 | Bates |
| 3,473,375 | Jenkins |
| 3,527,099 | Herceg |
| 3,537,319 | Yerman |
| 3,641,812 | Vick |
| 3,697,917 | Orth |
| 3,697,918 | Orth |
| 3,820,401 | Lewis |

The class and subclasses searched were:

| CLASS | SUBCLASS |
|---|---|
| 73 | 388 |
| 73 | 398 |
| 73 | 406 |
| 73 | 408 |

While presently available pressure transducers can measure differential pressures to a high degree of precision, bonding methods are such that many of the piezoresistive elements can slip from their positions through failure of the bonding cement after repeated flexing and thus no longer occupy the optimum positions determined in their design and fabrication. It has also been inconvenient to protect the sensing elements from the pressurized media in some applications.

It would thus be a great advantage to the art to provide a piezoresistive type differential pressure transducer in which positional integrity of sensing elements is of a high degree.

It would be a further advantage to provide such a pressure transducer in which the sensing elements are isolated from the pressure supporting media.

It would also, of course, be a desirable advantage to provide such a transducer in a comparatively economical structure.

SUMMARY OF THE INVENTION

It is an object of the present invention to provide a piezoresistive differential pressure transducer in which the piezoresistive elements do not readily slip from their initial positions.

It is a further object of the invention to provide such a transducer in which the sensing elements are isolated from the pressure supporting media.

It is a still additional object to provide such a transducer in an economical structure.

In the accomplishment of these and other objects, a dry-type, piezoresistive, isolated media differential pressure transducer is provided in which four strain sensitive piezo-resistive elements are fused to the inside bottom of a cup-like, relatively thin circular center section formed in a machined metal center section. The elements are then covered with a protective epoxy layer which fills the cup-like center section and which then is itself covered with a flat isolating disc thus forming a laminated sensor. The piezoresistive elements are interconnected in a conventional bridge circuit and exterior leads are brought out of the instrument in a manner well known in the art. End fittings having pressure ports are fastened to the machined metal center section serving as over-pressure stops in addition to admitting pressures to the laminated sensor.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
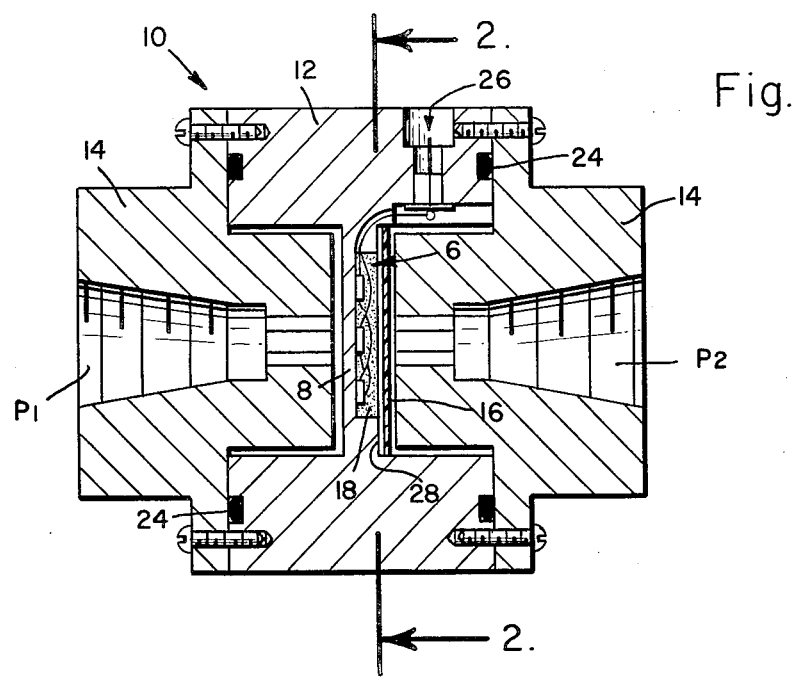
FIG. 1 is an enlarged cross-sectional view of a differential pressure transducer as contemplated by the invention.

Referring to FIG. 1 with greater particularity, the differential pressure transducer of the invention is denoted generally by the numeral 10. A machined metal center section 12 has a thin, circular center section 8 itself defining a cup 6 on one side thereof having a low circular step 28. Piezoresistive, strain sensitive elements are denoted by the numeral 20 and are shown fused to the bottom surface of cup 6. A protective epoxy covering 18 is shown as covering the piezoresistive, strain sensitive elements 20 and filling cup 6 up to low circular step 28. An isolating disc 16 covers the protective epoxy covering 18 and is supported by low circular step 28, thus forming a laminated sensor. Feedthrough terminals 26 are utilized to bring connecting leads from the piezoresistive, strain sensitive elements 20. End fittings 14 are fastened to machined metal center section 12 and sealed thereto by means of O-rings 24. End fittings 14 have pressure ports denoted by characters $P_1$ and $P_2$.

In operation, stress applied to pressure ports $P_1$ and $P_2$ will cause strain in the thin circular center section 8, in turn causing the piezoresistive strain sensitive elements to change their resistance in functional relationship to the applied stress. In some of the prior art literature examined, the terms "stress" and "strain" have been used as synonymous. However, it is noted that stress is properly defined as being measured by a force applied per unit area which produces or tends to produce deformation in a body, thus:

$$\text{Stress} = \frac{\text{force}}{\text{area of surface on which force acts}} = \frac{F}{A}$$

and is expressed in units such as:

$$\frac{\text{newtons}}{\text{meter}^2} \text{ or } \frac{\text{dynes}}{\text{centimeter}^2}$$

On the other hand, strain is properly defined as the fractional deformation in a body resulting from a stress and is dimensionless. For example, if a wire of initial length L is stretched an amount $\Delta L$, there is a longitudinal strain of $(\Delta L/L)$.

$$\text{i.e. Strain} = \frac{\text{change in length}}{\text{initial length}} = \frac{\Delta L}{L}$$

Thus, in our application, the applied pressure will provide a stress and the deformation resulting in our laminated sensor is a measure of strain and is to be sensed by the piezoeresistive, strain sensitive elements.

Figure 3:
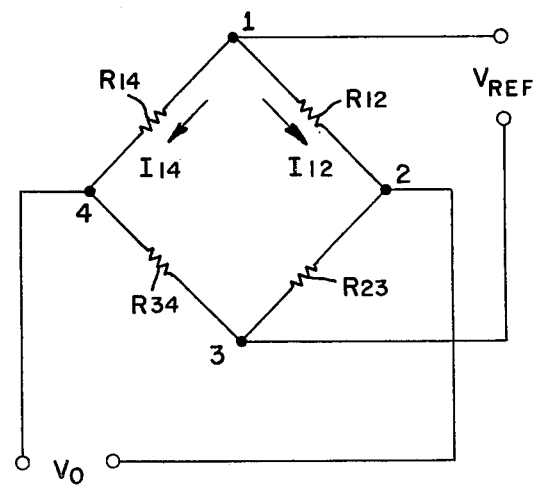
FIG. 3 is a schematic diagram of a Wheatstone bridge arrangement representing the interconnection of the piezoresistive elements of the invention.

It is usual to connect these piezoresistive, strain sensitive elements in a bridge circuit such that positive gage factor elements alternate with negative gage factor elements. In FIG. 3, for example, if $R_{12}$ is a positive gage factor element, then $R_{23}$ and $R_{14}$ would be negative gage factor elements, with $R_{34}$ being also a positive gage factor element. Such a configuration contributes to increase the output signal delivered by the bridge circuit for a given applied stress.

It may be interesting to consider a numerical example in respect to the bridge configuration since no such example was found in the prior art. It is to be understood that the numerical values chosen are not to be considered as limiting, but as solely for the purpose of illustration.

Consider the bridge arrangement of FIG. 3 as made up of piezoresistive, strain sensitive elements having initial resistances of 1000 ohms each and having an input voltage $V_{REF} = 10$ volts. The resistance seen at terminals 1 and 3 will be $R_T$, where:

$$\frac{1}{R_T} = \frac{1}{R_{12} + R_{23}} + \frac{1}{R_{14} + R_{34}} =$$

$$\frac{1}{2 \times 10^3} + \frac{1}{2 \times 10^3} = \frac{2}{2 \times 10^3}$$

so that $R_T = 1 \times 10^3$ ohms.
Current flow will then be:

$$I_T = \frac{V_{REF}}{R_T} = \frac{10}{1 \times 10^3} = 10 \times 10^{-3} = 10 \, ma$$

Now also $I_T = I_{12} + I_{14}$
where:

$$I_{12} = \frac{10}{2 \times 10^3} = 5 \times 10^{-3} a = 5 \, ma$$

and $$I_{14} = \frac{10}{2 \times 10^3} = 5 \times 10^{-3} a = 5 \, ma$$

Under conditions, as above, of no strain of the sensor assembly, the voltage drop across $R_{12}$ will be equal to the voltage drop across $R_{14}$ and likewise voltage drops across $R_{23}$ and $R_{34}$ will be equal. Voltage appearing at terminals 2 and 4 will therefore be equal and thus the output voltage $V_o$ will be zero, that is:

$$V_o = 0$$

If we now apply a stress by way of unequal pressures applied to ports $P_1$ and $P_2$ so as to cause a strain resulting in a 2 ohm change in each piezoresistive, strain sensitive element according to its sensing orientation, we will have the new resistance conditions:

$$R_{12} = 1002 \text{ ohm} = R_{34}$$

$$R_{23} = 998 \text{ ohms} = R_{14}$$

We will still obtain the same values for $I_{12}$ and $I_{14}$ since $$\frac{1}{R_T} = \frac{1}{1002 + 998} + \frac{1}{1002 + 998} =$$

$$\frac{1}{2000} + \frac{1}{2000} = \frac{2}{2000}$$

so that
$I_T$ again equals 10 ma and $$I_{12} = \frac{10}{1002 + 998} = 5 \, ma = I_{14}$$

However,
$I_{12} R_{12} = 5 \times 10^{-3} a \times 1002 = 5.01$ volts at terminal 2, and
$I_{14} R_{14} = 5 \times 10^{-3} a \times 998 = 4.99$ volts at terminal 4, so that
$V_o = 5.01 - 4.99 = 20 \times 10^{-3} = 20$ millivolts as a result of the stress causing the resulting strain. The output voltage $V_o$, is thus a measure of the differential pressure, $P_1 - P_2$, and the greater pressure will be identified by the sense of the voltage, $V_o$, that is, whether the voltage at terminal 2 or terminal 4 is the larger.

Figure 2:
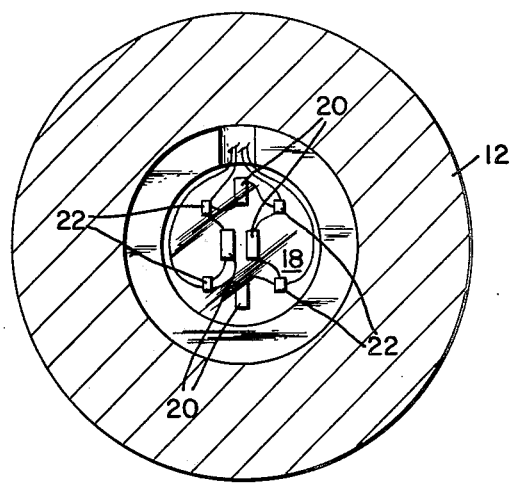
FIG. 2 is a view taken as indicated by the sight lines 2—2 of FIG. 1.

Referring now to FIG. 2, an arrangement of piezoresistive strain sensitive elements 20 is shown along with termination tabs 22 in a manner well known in the art.

Thus there has been described a dry-type, piezoresistive, isolated media, differential pressure transducer that will facilitate measurements of differential pressures. Great improvements in flexibility, maintainability, and reliability have been provided through the novel advantages of the invention.

It is pointed out that although the present invention has been shown and described with reference to particular embodiment, nevertheless various changes and modifications obvious to one skilled in the art to which the invention pertains are deemed to lie within the purview of the invention.

What is claimed and desired to be secured by Letters Patent of the United States is:

1. A dry piezoresistive differential pressure transducer comprising:
   a machined metal center section;
   a relatively thin circular center section formed in said machined metal center section;
   piezoresistive elements fused to the relatively thin circular section;
   a protective layer covering the piezoresistive elements;
   a flat isolating disc covering said protective layer;
   end fittings fastened to said machined metal center section;
   means for applying pressures to said pressure transducer through said end fittings; and
   means for connecting said piezoresistive elements exteriorly of said pressure transducer.

2. The pressure transducer of claim 1, wherein said protective layer is formed of epoxy.

3. The pressure transducer of claim 1, wherein said piezoresistive elements are connected in a Wheatstone bridge arrangement.

4. The pressure transducer of claim 3, wherein said piezoresistive elements are connected in alternate positive and negative gage configuration.

5. The pressure transducer of claim 1, wherein said relatively thin circular center section has a low center step forming a mechanical support for the flat isolating disc.

6. A method of making a laminated pressure sensitive sensor comprising the steps of:
   machining a relatively thin circular center section;
   forming a cup-like center in said circular center section;
   fusing piezoresistive elements to the inside bottom of said cup-like center;
   covering the piezoresistive elements with a protective layer;
   connecting the piezoresistive elements exteriorly of the transducer;
   overlaying the protective layer with an isolating disc.

* * * * *